US008511280B2

(12) United States Patent
Grandi

(10) Patent No.: US 8,511,280 B2

(45) Date of Patent: Aug. 20, 2013

(54) COUPLING DEVICE

(75) Inventor: Mauro Grandi, Leghorn (IT)

(73) Assignee: Continental Automotive GmbH, Hannover (DE)

( * ) Notice: Subject to any disclaimer, the term of this patent is extended or adjusted under 35 U.S.C. 154(b) by 595 days.

(21) Appl. No.: 12/843,040

(22) Filed: Jul. 25, 2010

(65) Prior Publication Data

US 2011/0017175 A1 Jan. 27, 2011

(30) Foreign Application Priority Data

Jul. 24, 2009 (EP) .................................... 09009637

(51) Int. Cl.
*F02M 61/14* (2006.01)
*F16L 37/00* (2006.01)

(52) U.S. Cl.
USPC .......................................... 123/470; 285/305

(58) Field of Classification Search
USPC ......... 123/470, 456; 285/305, 326; 239/600; 403/322.2
See application file for complete search history.

(56) References Cited

U.S. PATENT DOCUMENTS

| | | | | |
|---|---|---|---|---|
| 2,438,626 | A * | 3/1948 | Strickland | 408/73 |
| 3,508,772 | A * | 4/1970 | Stahl et al. | 403/355 |
| 6,053,149 | A * | 4/2000 | Lorraine | 123/470 |
| 6,481,420 | B1 * | 11/2002 | Panasuk et al. | 123/470 |
| 7,104,257 | B2 * | 9/2006 | Kawamoto et al. | 123/470 |
| 7,607,418 | B2 | 10/2009 | Abe et al. | 123/470 |
| 7,934,488 | B2 * | 5/2011 | Biasci et al. | 123/470 |
| 2002/0148446 | A1 | 10/2002 | Gmelin | 123/470 |

FOREIGN PATENT DOCUMENTS

| | | | |
|---|---|---|---|
| DE | 10108203 | A1 | 8/2002 |
| EP | 1849995 | A1 | 10/2007 |
| EP | 1862668 | B1 | 3/2009 |
| EP | 2034171 | A3 | 4/2009 |
| EP | 2093414 | A1 | 8/2009 |

* cited by examiner

*Primary Examiner* — Stephen K Cronin
*Assistant Examiner* — Pedro Gomez
(74) *Attorney, Agent, or Firm* — King & Spalding L.L.P.

(57) ABSTRACT

The coupling device has a fuel injector cup, a first and second flange, a shell and fixing element. The fuel injector cup has a central longitudinal axis and can be hydraulically coupled to the fuel rail and engages a fuel inlet portion. The first flange is fixedly coupled to the cup and the second flange to the injector. The shell has first and second projections between which the flanges are axially arranged, and the flanges are in mechanical cooperation with the shell element to retain the injector in the cup in central longitudinal axis direction. The fixing element is arranged on a circumferential outer surface of the shell and prevents a radial movement of it relative to the flanges. The fixing element has a radially spring-loaded element which engages with a recess in the shell element to prevent an axial movement of the fixing element relative to the shell.

18 Claims, 4 Drawing Sheets

COUPLING DEVICE

CROSS-REFERENCE TO RELATED APPLICATIONS

This application claims priority to EP Patent Application No. 09009637 filed Jul. 24, 2009, the contents of which is incorporated herein by reference in its entirety.

TECHNICAL FIELD

The invention relates to a coupling device for hydraulically and mechanically coupling a fuel injector to a fuel rail of a combustion engine.

BACKGROUND

Coupling devices for hydraulically and mechanically coupling a fuel injector to a fuel rail are in widespread use, in particular for internal combustion engines. Fuel can be supplied to an internal combustion engine by the fuel rail assembly through the fuel injector. The fuel injectors can be coupled to the fuel injector cups in different manners.

In order to keep pressure fluctuations during the operation of the internal combustion engine at a very low level, internal combustion engines are supplied with a fuel accumulator to which the fuel injectors are connected and which has a relatively large volume. Such a fuel accumulator is often referred to as a common rail.

Known fuel rails comprise a hollow body with recesses in form of fuel injector cups, wherein the fuel injectors are arranged. The connection of the fuel injectors to the fuel injector cups that supply the fuel from a fuel tank via a low or high-pressure fuel pump needs to be very precise to get a correct injection angle and a sealing of the fuel.

SUMMARY

According to various embodiments, a coupling device for hydraulically and mechanically coupling a fuel injector to a fuel rail can be created which is simply to be manufactured and which facilitates a reliable and precise connection between the fuel injector and the fuel injector cup without a resting of the fuel injector on the cylinder head.

According to an embodiment, a coupling device for hydraulically and mechanically coupling a fuel injector to a fuel rail of a combustion engine, may comprise: a fuel injector cup having a central longitudinal axis and being designed to be hydraulically coupled to the fuel rail and to engage a fuel inlet portion of the fuel injector, a first flange being fixedly coupled to the fuel injector cup and a second flange being fixedly coupled to the fuel injector, at least one shell element, the shell element comprising a first projection and a second projection, the flanges being axially arranged between the first projection and the second projection, and the shell element being designed and arranged in a way that the flanges are in mechanical cooperation with the shell element to retain the fuel injector in the fuel injector cup in direction of the central longitudinal axis, and a fixing element being arranged on a circumferential outer surface of the shell element and being designed to prevent a radial movement of the shell element relative to the flanges, wherein the fixing element comprises at least one radially spring-loaded element which is arranged and designed in a manner that the spring-loaded element is in engagement with a recess in the shell element to prevent an axial movement of the fixing element relative to the shell element.

According to a further embodiment of the above coupling device, the spring-loaded element can be shaped as a sphere.

According to another embodiment, a coupling device for hydraulically and mechanically coupling a fuel injector to a fuel rail of a combustion engine, may comprise: a fuel injector cup having a central longitudinal axis and being designed to be hydraulically coupled to the fuel rail and to engage a fuel inlet portion of the fuel injector, a first flange being fixedly coupled to the fuel injector cup and a second flange being fixedly coupled to the fuel injector, at least one shell element, the shell element comprising a first projection and a second projection, the flanges being axially arranged between the first projection and the second projection, and the shell element being designed and arranged in a way that the flanges are in mechanical cooperation with the shell element to retain the fuel injector in the fuel injector cup in direction of the central longitudinal axis, and a fixing element being arranged on a circumferential outer surface of the shell element and being designed to prevent a radial movement of the shell element relative to the flanges, wherein a ring element is arranged in axial direction adjacent to the fixing element, the ring element being in mechanical cooperation with the fuel injector cup and/or the shell element and being designed to prevent an axial movement of the fixing element relative to the shell element.

According to a further embodiment of this coupling device, the ring element can be designed to enable an elastic expansion of the ring element in radial direction.

According to a further embodiment of any of the above coupling devices, the coupling device may comprise at least two shell elements. According to a further embodiment of any of the above coupling devices, the projection may form a shoulder being in mechanical cooperation with the fixing element to prevent a movement of the fixing element relative to the shell element at least in one axial direction. According to a further embodiment of any of the above coupling devices, the fixing element may have a tubular shape. According to a further embodiment of any of the above coupling devices, the fuel injector cup may comprise a groove, a first snap ring being arranged in the groove, with the groove and the first snap ring being arranged and designed to form a positive fitting coupling between the first flange and the fuel injector cup which is designed to prevent a movement of the first flange relative to the fuel injector cup at least in a first direction of the central longitudinal axis. According to a further embodiment of any of the above coupling devices, the first flange may be in one part with the fuel injector cup. According to a further embodiment of any of the above coupling devices, the fuel injector may comprise a groove, a second snap ring being arranged in the groove of the fuel injector, with the groove of the fuel injector and the second snap ring being arranged and designed to form a positive fitting coupling between the second flange and the fuel injector which is designed to prevent a movement of the second flange relative to the fuel injector at least in a second direction of the central longitudinal axis contrary to the first direction of the central longitudinal axis. According to a further embodiment of any of the above coupling devices, the second flange may be in one part with the fuel injector.

BRIEF DESCRIPTION OF THE DRAWINGS

Exemplary embodiments are explained in the following with the aid of schematic drawings. These are as follows.

DETAILED DESCRIPTION

Figure 1:
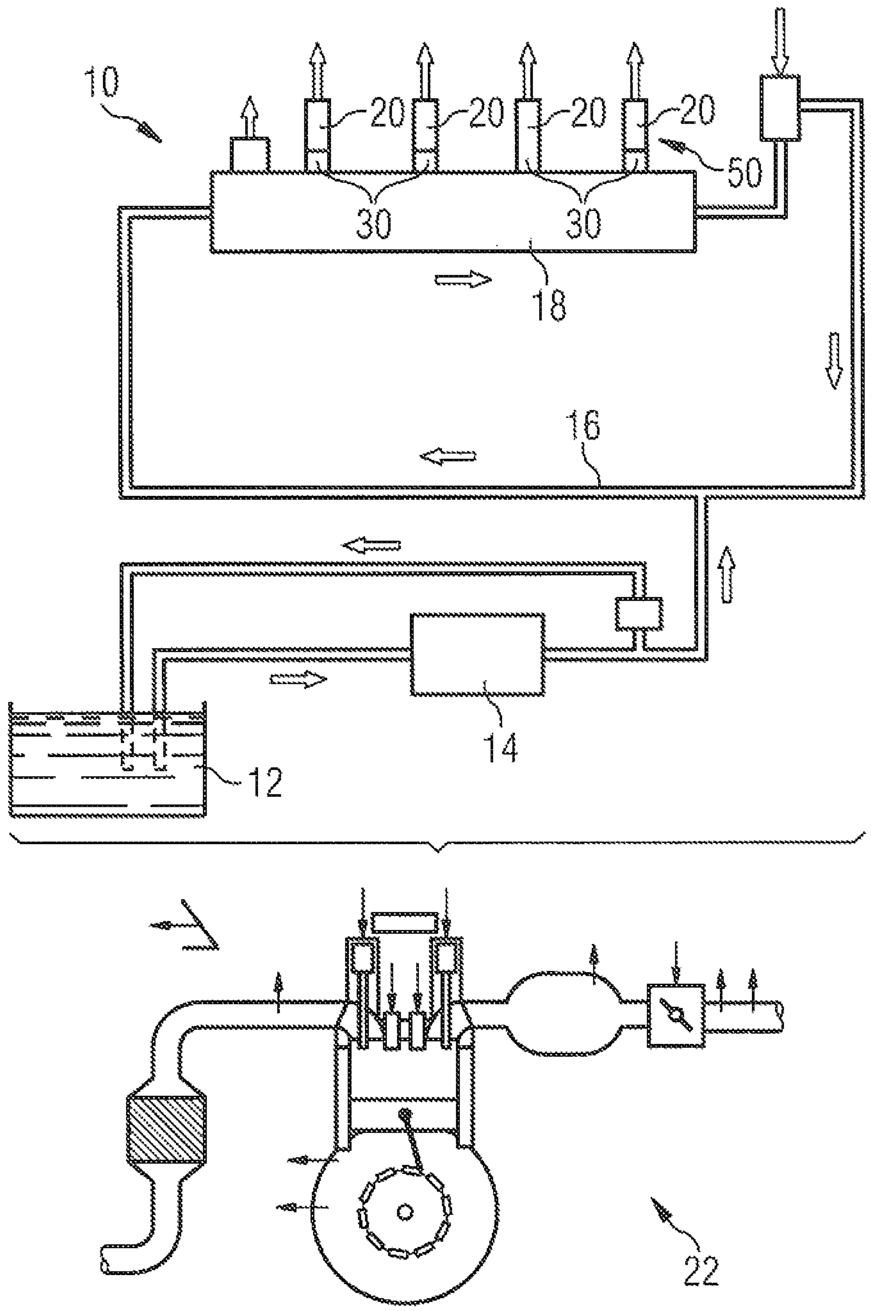
FIG. 1 an internal combustion engine in a schematic view.

According to a first aspect various embodiments are distinguished by a coupling device for hydraulically and mechanically coupling a fuel injector to a fuel rail of a combustion engine. The coupling device comprises a fuel injector cup having a central longitudinal axis and being designed to be hydraulically coupled to the fuel rail and to engage a fuel inlet portion of the fuel injector. The coupling device comprises a first flange being fixedly coupled to the fuel injector cup and a second flange being fixedly coupled to the fuel injector. The coupling device further comprises at least one shell element. The shell element comprises a first projection and a second projection. The flanges are axially arranged between the first projection and the second projection. The shell element is designed and arranged in a way that the flanges are in mechanical cooperation with the shell element to retain the fuel injector in the fuel injector cup in direction of the central longitudinal axis. The coupling device further comprises a fixing element which is arranged on a circumferential outer surface of the shell element and is designed to prevent a radial movement of the shell element relative to the flanges. The fixing element comprises at least one radially spring-loaded element which is arranged and designed in a manner that the spring-loaded element is in engagement with a recess in the shell element to prevent an axial movement of the fixing element relative to the shell element. This has the advantage that a fast and secure coupling of the fuel injector in the fuel injector cup is possible. The coupling device can resist the high fuel pressures in the fuel injector and the fuel injector cup. Furthermore, the coupling of the fuel injector with the fuel rail by the flanges of the fuel injector and the fuel injector cup allows an assembly of the fuel injector and the fuel rail without a further metallic contact between the fuel injector and further parts of the combustion engine. Consequently, a noise transmission between the fuel injector and further parts of the combustion engine can be kept small. The fixing element can ensure a secure coupling between the flanges and the shell elements. The spring-loaded element enables a secure arrangement of the fixing element in the recess to prevent a decoupling of the fixing element from the shell element. Furthermore, no particular adjustment is required to obtain a proper alignment between the fuel rail and the fuel injector.

In an embodiment the spring-loaded element is shaped as a sphere. This has the advantage that the spring-loaded sphere may hold the fixing element in its position relative to the shell element in a very exact manner. Therefore, a proper performance of the fuel injector/fuel rail assembly can be obtained.

According to a second aspect, various embodiments are distinguished by a coupling device for hydraulically and mechanically coupling a fuel injector to a fuel rail of a combustion engine. The coupling device comprises a fuel injector cup having a central longitudinal axis and being designed to be hydraulically coupled to the fuel rail and to engage a fuel inlet portion of the fuel injector. The coupling device comprises a first flange being fixedly coupled to the fuel injector cup and a second flange being fixedly coupled to the fuel injector. The coupling device further comprises at least one shell element. The shell element comprises a first projection and a second projection. The flanges are axially arranged between the first projection and the second projection. The shell element is designed and arranged in a way that the flanges are in mechanical cooperation with the shell element to retain the fuel injector in the fuel injector cup in direction of the central longitudinal axis. The coupling device further comprises a fixing element which is arranged on a circumferential outer surface of the shell element and is designed to prevent a radial movement of the shell element relative to the flanges. A ring element is arranged in axial direction adjacent to the fixing element. The ring element is in mechanical cooperation with the fuel injector cup and/or the shell element and is designed to prevent an axial movement of the fixing element relative to the shell element. This has the advantage that a fast and secure coupling of the fuel injector in the fuel injector cup is possible. The coupling device can resist the high fuel pressures in the fuel injector and the fuel injector cup. Furthermore, the coupling of the fuel injector with the fuel rail by the flanges of the fuel injector and the fuel injector cup allows an assembly of the fuel injector and the fuel rail without a further metallic contact between the fuel injector and further parts of the combustion engine. Consequently, a noise transmission between the fuel injector and further parts of the combustion engine can be kept small. The fixing element can ensure a secure coupling between the flanges and the shell elements. The ring element enables a secure arrangement of the fixing element relative to the shell element to prevent a decoupling of the fixing element from the shell element. Furthermore, no particular adjustment is required to obtain a proper alignment between the fuel rail and the fuel injector.

According to an embodiment according to the second aspect, the ring element is designed to enable an elastic expansion of the ring element in radial direction. This has the advantage that the ring element can be easily removed from the fuel injector cup for a simple mounting and demounting of the fuel injector to or from the fuel injector cup.

In a further embodiment according to the first and the second aspect, the coupling device comprises at least two shell elements. By this, a simple mounting and demounting of the shell elements to or from the flanges is possible. Consequently, a simple mounting and demounting of the fuel injector to or from the fuel injector cup can be carried out. Furthermore, an axial symmetric arrangement of the shell elements is possible. Consequently, an axially symmetrical distribution of forces in the coupling device is possible.

In a further embodiment according to the first and the second aspect, the projection forms a shoulder being in mechanical cooperation with the fixing element to prevent a movement of the fixing element relative to the shell element at least in one axial direction.

In a further embodiment according to the first and the second aspect, the fixing element has a tubular shape. By this, the fixing element can be easily arranged on the surface of the shell element. Furthermore, the fixing element can enable a secure coupling between the flanges and the shell elements.

In a further embodiment according to the first and the second aspect, the fuel injector cup comprises a groove, and a first snap ring is arranged in the groove and is designed to fixedly couple the first flange to the fuel injector cup. The groove and the first snap ring are arranged and designed to form a positive fitting coupling between the first flange and the fuel injector cup which is designed to prevent a movement of the first flange relative to the fuel injector cup at least in a first direction of the central longitudinal axis. This may allow a simple construction of the coupling device which enables to carry out a fast and secure but reversible coupling of the first flange to the fuel injector cup.

In a further embodiment according to the first and the second aspect, the first flange is in one part with the fuel injector cup. This has the advantage that a very secure coupling of the fuel injector to the fuel injector cup is possible. Furthermore, a simple machining of the first flange together with the fuel injector cup is possible.

In a further embodiment according to the first and the second aspect, the fuel injector comprises a groove, a second snap ring is arranged in the groove of the fuel injector and is designed to fixedly couple the second flange to the fuel injector. The groove of the fuel injector and the second snap ring are arranged and designed to form a positive fitting coupling between the second flange and the fuel injector which is designed to prevent a movement of the second flange relative to the fuel injector at least in a second direction of the central longitudinal axis contrary to the first direction of the central longitudinal. This may allow a simple construction of the coupling device which enables to carry out a fast and secure but reversible coupling of the second flange to the fuel injector.

In a further embodiment according to the first and the second aspect, the second flange is in one part with the fuel injector. This has the advantage that a very secure coupling of the fuel injector to the fuel injector cup is possible. Furthermore, a simple machining of the second flange together with the fuel injector is possible.

Elements of the same design and function that occur in different illustrations are identified by the same reference character.

A fuel feed device 10 is assigned to an internal combustion engine 22 (FIG. 1) which can be a diesel engine or a gasoline engine. It includes a fuel tank 12 that is connected via a first fuel line to a fuel pump 14. The output of the fuel pump 14 is connected to a fuel inlet 16 of a fuel rail 18. In the fuel rail 18, the fuel is stored for example under a pressure of about 200 bar in the case of a gasoline engine or of about 2,000 bar in the case of a diesel engine. Fuel injectors 20 are connected to the fuel rail 18 by fuel injector cups 30 and the fuel is fed to the fuel injectors 20 via the fuel rail 18.

Figure 2:
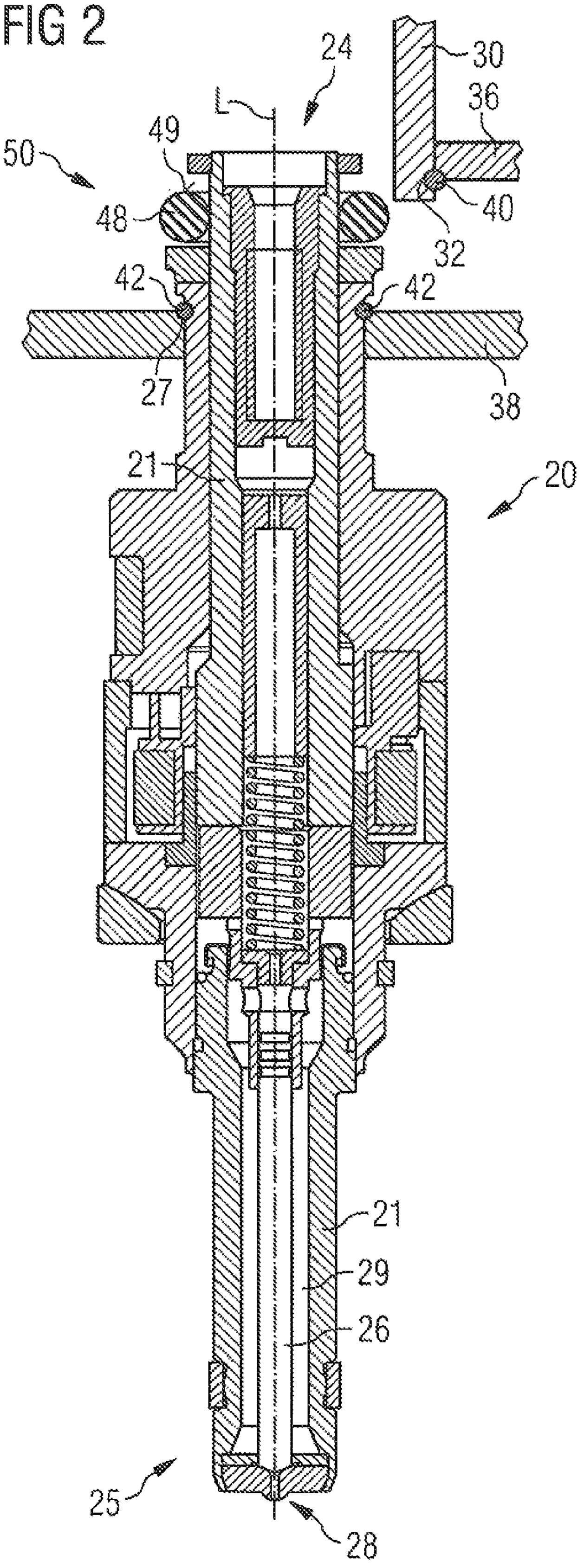
FIG. 2 a longitudinal section through a fuel injector.

FIG. 2 shows the fuel injector 20 which has a fuel injector body 21 and is suitable for injecting fuel into a combustion chamber of the internal combustion engine 22. The fuel injector 20 has a fuel inlet portion 24 and a fuel outlet portion 25. The fuel injector cup 30 has a central longitudinal axis L.

Furthermore, the fuel injector 20 comprises a valve needle 26 taken in a cavity 29 of the fuel injector body 21. On a free end of the fuel injector 20 an injection nozzle 28 is formed which is closed or opened by an axial movement of the valve needle 26. In a closing position a fuel flow through the injection nozzle 28 is prevented. In an opening position fuel can flow through the injection nozzle 28 into the combustion chamber of the internal combustion engine 22.

The fuel injector 20 has a groove 27 and the fuel injector cup 30 has a groove 32. A first snap ring 40 is arranged in the groove 32 of the fuel injector cup 30 and a second snap ring 42 which is arranged in the groove 27 of the fuel injector 20. A first flange 36 is in engagement with the first snap ring 40 and a second flange 38 is in engagement with the second snap ring 42.

The first snap ring 40 enables a positive fitting coupling between the first flange 36 and the fuel injector cup 30 to prevent a movement of the first flange 36 relative to the fuel injector cup 30 in a first direction D1. Therefore, the first flange 36 is fixedly coupled to the fuel injector cup 30. The second snap ring 42 enables a positive fitting coupling between the second flange 38 and the fuel injector 20 to prevent a movement of the second flange 38 relative to the fuel injector 20 in a second direction D2. Therefore, the second flange 38 is fixedly coupled to the fuel injector 20. The first direction D1 and the second direction D2 are opposite directions of the central longitudinal axis L.

FIGS. 2 to 5 show different embodiments of a coupling device 50 which is coupled to the fuel rail 18 of the internal combustion engine 22.

The coupling device 50 comprises the fuel injector cup 30, the first flange 36, the second flange 38, two shell elements 44, 45 and a fixing element 54. In further embodiments the number of shell elements can be one or greater than two.

The fuel injector cup 30 comprises an inner surface 34 and an outer surface 35 and is hydraulically coupled to the fuel rail 18. Furthermore, the fuel injector cup 30 is in engagement with the fuel inlet portion 24 of the fuel injector 20. The fuel inlet portion 24 of the fuel injector 20 comprises a sealing ring 48 with an outer surface 49.

Figure 3:
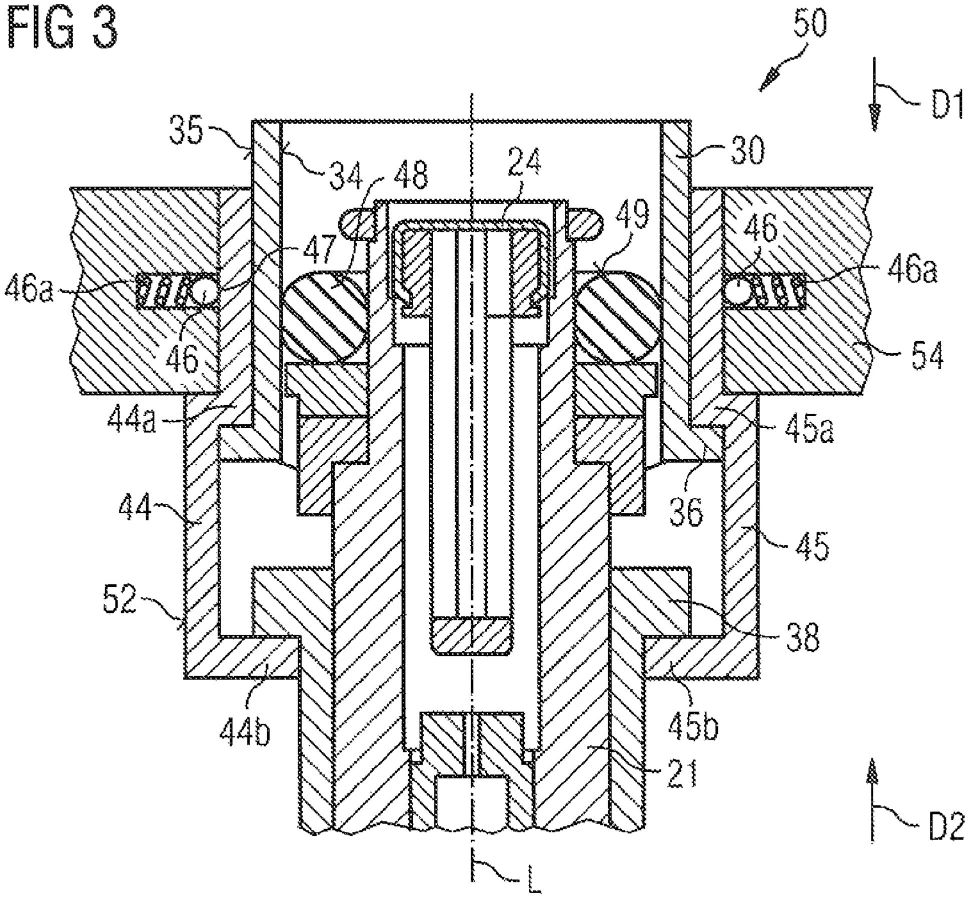
FIG. 3 a longitudinal section through one embodiment of a coupling device.
Figure 5:
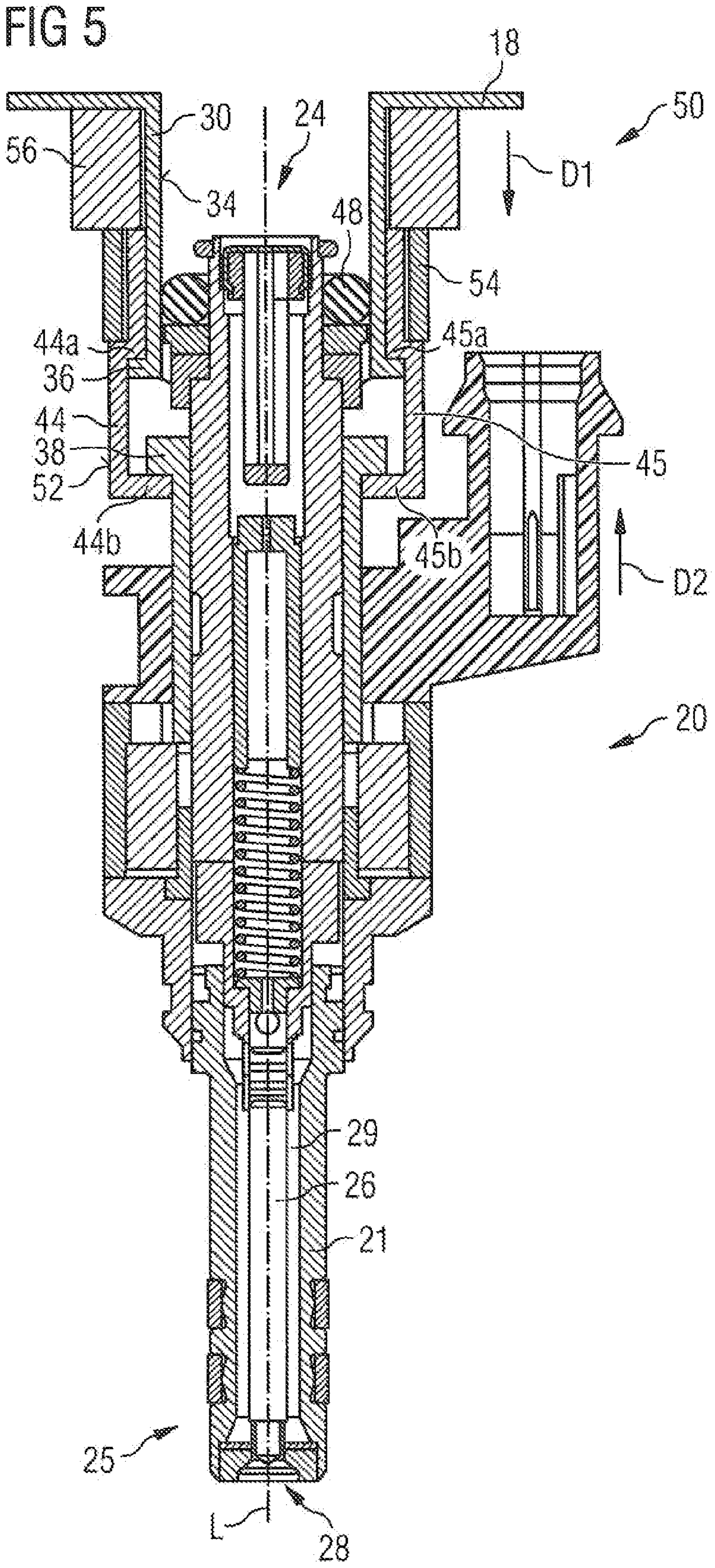

As shown in the embodiments of FIGS. 3 and 5, the first flange 36 may be preferably in one part with the fuel injector cup 30 and the second ring 38 may be preferably in one part with the fuel injector 20. By this a very rigid and very secure coupling between the fuel injector cup 30 and the fuel injector 20 is possible.

Figure 4:
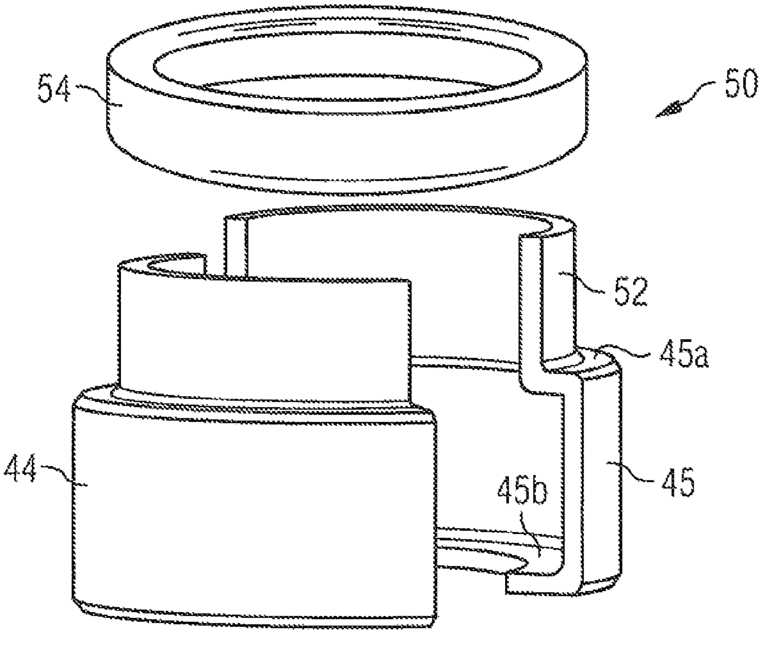
FIG. 4 a further embodiment of the coupling device in a perspective view, and FIG. 5 a longitudinal section through a further embodiment of the coupling device.

The shell elements 44, 45 have substantially the form of half hollow cylinders. They are arranged in a way that together they are forming basically a cylinder (FIG. 4). At a first axial end the shell element 44 has a first projection 44*a*. At a second axial end the shell element 44 has a second projection 44*b*. The shell element 45 has respective projections 45*a*, 45*b* at opposing axial ends. The projections 44*a*, 44*b*, 45*a*, 45*b* have planar surfaces which are facing the flanges 36, 38. The shell elements 44, 45 have circumferential outer surfaces 52.

The first flange 36 and the second flange 38 are axially arranged between the first projections 44*a*, 45*a* and the second projections 44*b*, 45*b*. Consequently, the first flange 36 and the second flange 38 are in engagement with the shell elements 44, 45 to prevent a movement of the flanges 36, 38 in direction of the central longitudinal axis L. By this, the fuel injector 20 is fixedly coupled to the fuel injector cup 30 in direction of the central longitudinal axis L.

Preferably, the fixing element 54 may have a tubular shape and is arranged on the circumferential outer surfaces 52 of the shell elements 44, 45.

As shown in FIG. 3, the fixing element 54 has at least one radially spring-loaded element 46 with a spring 46*a*. Preferably, the spring 46*a* can be a compression spring. Preferably, the spring-loaded element 46 may have a spherical shape and is in engagement with a recess 47 in the shell element 44, 45. By this an axial movement of the fixing element 54 relative to the shell element 44, 45 may be prevented. Preferably, the fixing element 54 may comprise a plurality of spring-loaded elements 46. This may prevent an axial movement of the fixing element 54 relative to the shell element 44, 45 in a very secure manner. Preferably, the spring-loaded elements 46 can be distributed regularly at an inner surface of the fixing element 54, i.e. the spring-loaded elements 46 are distributed with equal angle distances to each other. This may prevent an axial movement of the fixing element 54 relative to the shell element 44, 45 in a very secure manner.

The fixing element 54 can couple the shell elements 44, 45 fixedly to the flanges 36, 38. Thereby a movement of the shell elements 44, 45 relative to the flanges 36, 38 in a radial direction can be prevented.

As the first flange 36 is fixedly coupled to the fuel injector cup 30, the second flange 38 is fixedly coupled to the fuel injector 20 and the first flange 36 is fixedly coupled to the second flange 38 by the shell elements 44, 45 and the fixing element 54, the fuel injector 20 is retained in the fuel injector cup 30 in direction of the central longitudinal axis L.

In the following, the assembly and disassembly of the fuel injector 20 and the fuel injector cup 30 according to the embodiment of FIGS. 3 and 4 will be described:

For assembling, the fuel inlet portion 24 of the fuel injector 20 is shifted into the fuel injector cup 30 in a way that the flanges 36, 38 are in engagement with each other. Then, the shell elements 44, 45 are shifted over the flanges 36, 38 in radial direction towards the central longitudinal axis L and the fixing element 54 is shifted over the shell elements 44, 45 in radial direction until the spring-loaded element 46 is in engagement with the recess 47. Now, a state as shown in FIG. 3 is obtained and the shell elements 44, 45 are fixed against a movement in radial direction relative to the flanges 36, 38. As can be seen in FIG. 3, the inner surface 34 of the fuel injector cup 30 is in sealing engagement with the outer surface 49 of the sealing ring 48. After the assembly process fuel can flow through the fuel injector cup 30 into the fuel inlet portion 24 of the fuel injector 20 without fuel leakage.

To disassemble the fuel injector 20 from the fuel injector cup 30, the fixing element 54 is removed from the shell elements 44, 45 and the shell elements 44, 45 are removed from the flanges 36, 38. Then, the fuel injector 20 can be shifted away from the fuel injector cup 30 in axial direction and the fuel injector cup 30 and the fuel injector 20 can be separated from each other.

As shown in FIG. 5, the coupling device 50 comprises a ring element 56 which is arranged in axial direction relative and adjacent to the fixing element 54. The ring element 56 is in mechanical cooperation with the fuel injector cup 30 and may prevent an axial movement of the fixing element 54 relative to the shell elements 44, 45. Preferably, the ring element 56 may be of a rubber or a plastic or may comprise a rubber or a plastic. The ring element 56 is elastically expandable in radial direction. Therefore, the ring element 56 can be easily disassembled from or assembled to the fuel injector cup 30 and the shell elements 44, 45 during the assembly and disassembly of the fuel injector 20 and the fuel injector cup 30.

The coupling of the fuel injector 20 with the fuel rail 18 by the flanges 36, 38 and the shell elements 44, 45 allows an assembly of the fuel injector 20 and the fuel injector cup 30 without a further metallic contact between the fuel injector 20 and the further parts of the combustion engine 22. A sealing between the fuel injector body 21 and a combustion chamber of the combustion engine 22 can be carried out by a plastic element, in particular by a PTFE element. Consequently, noise transmission between the fuel injector 20 and further parts of the internal combustion engine can be kept small. Furthermore, a proper alignment between the fuel rail 18 and the fuel injector 20 is possible without any particular adjustment.

What is claimed is:

1. A coupling device for hydraulically and mechanically coupling a fuel injector to a fuel rail of a combustion engine, the coupling device comprising a fuel injector cup having a central longitudinal axis and being designed to be hydraulically coupled to the fuel rail and to engage a fuel inlet portion of the fuel injector, a first flange being fixedly coupled to the fuel injector cup and a second flange being fixedly coupled to the fuel injector, at least one shell element, the shell element comprising a first projection and a second projection, the flanges being axially arranged between the first projection and the second projection, and the shell element being designed and arranged in a way that the flanges are in mechanical cooperation with the shell element to retain the fuel injector in the fuel injector cup in direction of the central longitudinal axis, and a fixing element being arranged on a circumferential outer surface of the shell element and being designed to prevent a radial movement of the shell element relative to the flanges, wherein the fixing element comprises at least one radially spring-loaded element which is arranged and designed in a manner that the spring-loaded element is in engagement with a recess in the shell element to prevent an axial movement of the fixing element relative to the shell element.

2. The coupling device according to claim 1, wherein the spring-loaded element is shaped as a sphere.

3. The coupling device according to claim 1, comprising at least two shell elements.

4. The coupling device according to claim 1, wherein the projection forms a shoulder being in mechanical cooperation with the fixing element to prevent a movement of the fixing element relative to the shell element at least in one axial direction.

5. The coupling device according to claim 1, with the fixing element having a tubular shape.

6. The coupling device according to claim 1, with the fuel injector cup comprising a groove, a first snap ring being arranged in the groove, with the groove and the first snap ring being arranged and designed to form a positive fitting coupling between the first flange and the fuel injector cup which is designed to prevent a movement of the first flange relative to the fuel injector cup at least in a first direction of the central longitudinal axis.

7. The coupling device according to claim 1, with the first flange being in one part with the fuel injector cup.

8. The coupling device according to claim 1, with the fuel injector comprising a groove, a second snap ring being arranged in the groove of the fuel injector, with the groove of the fuel injector and the second snap ring being arranged and designed to form a positive fitting coupling between the second flange and the fuel injector which is designed to prevent a movement of the second flange relative to the fuel injector at least in a second direction of the central longitudinal axis contrary to the first direction of the central longitudinal axis.

9. The coupling device according to claim 1, with the second flange being in one part with the fuel injector.

10. A coupling device for hydraulically and mechanically coupling a fuel injector to a fuel rail of a combustion engine, the coupling device comprising a fuel injector cup having a central longitudinal axis and being designed to be hydraulically coupled to the fuel rail and to engage a fuel inlet portion of the fuel injector, a first flange being fixedly coupled to the fuel injector cup and a second flange being fixedly coupled to the fuel injector, at least one shell element, the shell element comprising a first projection and a second projection, the flanges being axially arranged between the first projection and the second projection, and the shell element being designed and arranged in a way that the flanges are in mechanical cooperation with the shell element to retain the fuel injector in the fuel injector cup in direction of the central longitudinal axis, and a fixing element being arranged on a circumferential outer surface of the shell element and being designed to prevent a radial movement of the shell element relative to the flanges, wherein a ring element is arranged in axial direction adjacent to the fixing element, the ring element being in mechanical cooperation with the fuel injector cup and/or the shell element and being designed to prevent an axial movement of the fixing element relative to the shell element.

11. The coupling device according to claim 10, wherein the ring element is designed to enable an elastic expansion of the ring element in radial direction.

12. The coupling device according to claim 10, comprising at least two shell elements.

13. The coupling device according to claim 10, wherein the projection forms a shoulder being in mechanical cooperation with the fixing element to prevent a movement of the fixing element relative to the shell element at least in one axial direction.

14. The coupling device according to claim 10, with the fixing element having a tubular shape.

15. The coupling device according to claim 10, with the fuel injector cup comprising a groove, a first snap ring being arranged in the groove, with the groove and the first snap ring being arranged and designed to form a positive fitting coupling between the first flange and the fuel injector cup which is designed to prevent a movement of the first flange relative to the fuel injector cup at least in a first direction of the central longitudinal axis.

16. The coupling device according to claim 10, with the first flange being in one part with the fuel injector cup.

17. The coupling device according to claim 10, with the fuel injector comprising a groove, a second snap ring being arranged in the groove of the fuel injector, with the groove of the fuel injector and the second snap ring being arranged and designed to form a positive fitting coupling between the second flange and the fuel injector which is designed to prevent a movement of the second flange relative to the fuel injector at least in a second direction of the central longitudinal axis contrary to the first direction of the central longitudinal axis.

18. The coupling device according to claim 10, with the second flange being in one part with the fuel injector.

* * * * *